(12) United States Patent
Son et al.

(10) Patent No.: US 11,690,038 B2
(45) Date of Patent: Jun. 27, 2023

(54) METHOD AND APPARATUS FOR MUTUALLY EXCLUSIVE ACCESS TO NETWORK SLICE FOR ROAMING TERMINAL IN WIRELESS COMMUNICATION SYSTEM

(71) Applicant: Samsung Electronics Co., Ltd., Suwon-si (KR)

(72) Inventors: Jungje Son, Suwon-si (KR); Hoyeon Lee, Suwon-si (KR); Sunghoon Kim, Suwon-si (KR); Jungshin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 17/281,930

(22) PCT Filed: Oct. 1, 2019

(86) PCT No.: PCT/KR2019/012810
§ 371 (c)(1),
(2) Date: Mar. 31, 2021

(87) PCT Pub. No.: WO2020/071727
PCT Pub. Date: Apr. 9, 2020

(65) Prior Publication Data
US 2021/0385777 A1 Dec. 9, 2021

(30) Foreign Application Priority Data
Oct. 1, 2018 (KR) .................. 10-2018-0117161

(51) Int. Cl.
*H04W 60/00* (2009.01)
*H04W 8/18* (2009.01)
*H04W 48/18* (2009.01)

(52) U.S. Cl.
CPC ............. *H04W 60/00* (2013.01); *H04W 8/18* (2013.01); *H04W 48/18* (2013.01)

(58) Field of Classification Search
CPC ....... H04W 60/00; H04W 8/18; H04W 48/18; H04W 8/02
See application file for complete search history.

(56) References Cited

U.S. PATENT DOCUMENTS 10,142,994 B2   11/2018   Lee et al.
10,237,681 B2   3/2019    Kim et al.
(Continued)

FOREIGN PATENT DOCUMENTS

KR   10-2017-0119296 A   10/2017
KR   10-2018-0081969 A   7/2018
(Continued)

OTHER PUBLICATIONS

Supplementary European Search Report dated Sep. 28, 2021, in connection with European Application No. 19869041.4, 8 pages.
(Continued)

*Primary Examiner* — Marcus Hammonds

(57) ABSTRACT

The present disclosure relates to a communication method for converging IoT technology with a 5G communication system for supporting a higher data transmission rate beyond a 4G systems, and to a system for same. The present disclosure may be applied to intelligent services (for example, smart homes, smart buildings, smart cities, smart cars or connected cars, healthcare, digital education, retail business, security and safety-related services, etc.) based on 5G communication technology and IoT-related technology.

16 Claims, 8 Drawing Sheets

(56) References Cited

U.S. PATENT DOCUMENTS

| | | | |
|---|---|---|---|
| 2017/0303259 A1* | 10/2017 | Lee | H04W 28/16 |
| 2018/0199279 A1 | 7/2018 | Baek et al. | |
| 2018/0227873 A1* | 8/2018 | Vrzic | H04W 28/26 |
| 2018/0270744 A1 | 9/2018 | Griot et al. | |
| 2019/0166467 A1* | 5/2019 | Livanos | H04W 48/00 |
| 2019/0335366 A1* | 10/2019 | Jin | H04W 76/16 |
| 2020/0053643 A1 | 2/2020 | Lee et al. | |
| 2020/0120580 A1* | 4/2020 | Jin | H04W 74/00 |
| 2020/0120590 A1* | 4/2020 | Trivisonno | H04W 60/005 |

FOREIGN PATENT DOCUMENTS

| | | |
|---|---|---|
| KR | 10-2018-0091676 A | 8/2018 |
| KR | 10-2020-0019042 A | 2/2020 |
| WO | 2018/175260 A1 | 9/2018 |

OTHER PUBLICATIONS

Trivisonno, et al. "Network Slicing for 5G Systems: A Review from an Architecture and Standardization Perspective," 2017 IEEE Conference on Standards for Communications and Networking (CSCN), IEEE, Sep. 18, 2017, XP033241362, 6 pages.

International Search Report dated Jan. 10, 2020 in connection with International Patent Application No. PCT/KR2019/012810, 2 pages.

Written Opinion of the International Searching Authority dated Jan. 10, 2020 in connection with International Patent Application No. PCT/KR2019/012810, 6 pages.

* cited by examiner

FIG. 2

| Configured NSSAI for HPLMN | S-NSSAI | SG ID |
|---|---|---|
| | S-NSSAI 1 | SG ID 1 |
| | S-NSSAI 2 | SG ID 1 |
| | S-NSSAI 3 | SG ID 2 |
| | S-NSSAI 4 | Dedicated Value (e.g. 0) (indicating belonging to any SG IDs at a time) |

Rel 15      Rel 16

METHOD AND APPARATUS FOR MUTUALLY EXCLUSIVE ACCESS TO NETWORK SLICE FOR ROAMING TERMINAL IN WIRELESS COMMUNICATION SYSTEM

CROSS-REFERENCE TO RELATED APPLICATIONS

This application is a 371 of International Application No. PCT/KR2019/012810 filed on Oct. 1, 2019, which claims priority to Korean Patent Application No. 10-2018-0117161 filed on Oct. 1, 2018, the disclosures of which are herein incorporated by reference in their entirety.

BACKGROUND

1. Field

The disclosure relates to a method for providing network slicing during movement of a mobile communication terminal between mobile communication service providers in a wireless communication system.

2. Description of Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System." Implementation of the 5G communication system in ultrahigh frequency (mmWave) bands, e.g., 60 GHz bands, is being considered in order to accomplish higher data transmission rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) network where distributed entities, such as things, exchange and process information without human intervention. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

An aspect of the disclosure is to provide an apparatus and a method, which can effectively provide a mobile communication service based on a network slice even in case that a mobile communication terminal moves to a mobile communication service provider providing the network slice in a mobile communication system.

SUMMARY

In one aspect of the disclosure to solve the above problem, a method by an apparatus for performing an access management function (AMF) in a wireless communication system includes: receiving a registration request message transmitted from a terminal through a base station; identifying subscriber information on the terminal; determining network slicing configuration information based on the subscriber information; and transmitting a registration response message including the network slicing configuration information, wherein the network slicing configuration information includes a network slicing identifier and a slicing group identifier for the terminal.

In another aspect of the disclosure to solve the above problem, a method by a terminal in a wireless communication system includes: transmitting a registration request message to a base station; and receiving a registration response message including network slicing configuration information determined based on subscriber information on the terminal, wherein the network slicing configuration information includes a network slicing identifier and a slicing group identifier for the terminal.

In still another aspect of the disclosure to solve the above problem, an apparatus for performing an access management function (AMF) in a wireless communication system includes: a transceiver; and a controller configured to: receive a registration request message transmitted from a terminal through a base station, identify subscriber information on the terminal, determine network slicing configuration information based on the subscriber information, and transmit a registration response message including the network slicing configuration information, wherein the network slicing configuration information includes a network slicing identifier and a slicing group identifier for the terminal.

In still another aspect of the disclosure to solve the above problem, a terminal in a wireless communication system includes: a transceiver; and a controller configured to: transmit a registration request message to a base station, and receive a registration response message including network slicing configuration information determined based on subscriber information on the terminal, wherein the network slicing configuration information includes a network slicing identifier and a slicing group identifier for the terminal.

According to an embodiment of the disclosure, even in case that the mobile communication terminal moves the mobile communication service provider providing the network slice in the mobile communication system, the terminal can access to the mobile communication system of the corresponding service provider, and the corresponding mobile communication system can effectively provide the mobile communication service based on the network slice to which the terminal subscribes.

BRIEF DESCRIPTION OF THE DRAWINGS

FIG. 2 illustrates a method for configuring information related to a network slice according to an embodiment of the disclosure.

DETAILED DESCRIPTION

Figure 1:
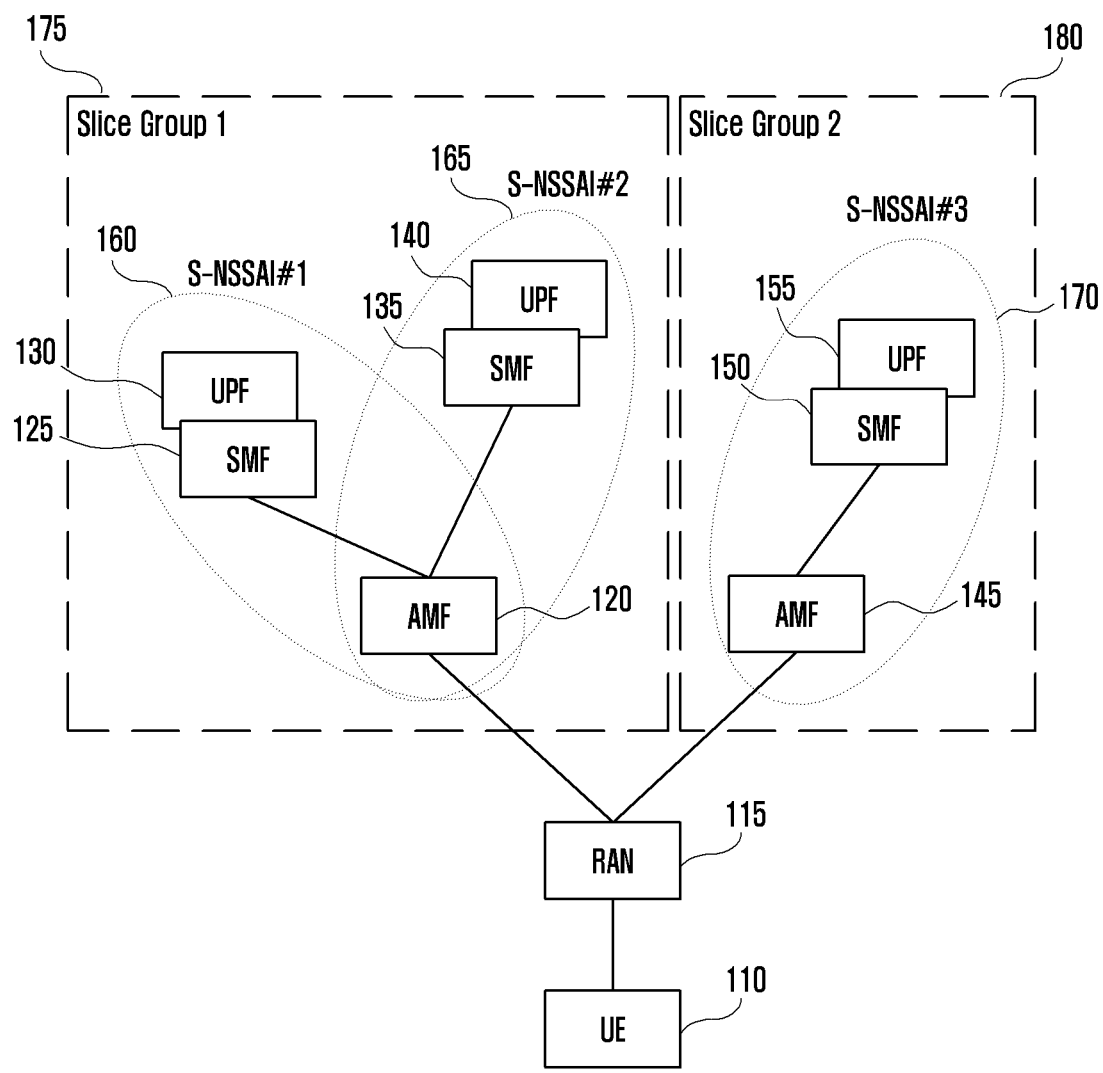
FIG. 1 illustrates a 5G network slice structure according to an embodiment of the disclosure.

Hereinafter, the operation principle of the disclosure will be described in detail with reference to the accompanying drawings. In describing the disclosure, a detailed description of related known functions or configurations will be omitted if it is determined that it obscures the disclosure in unnecessary detail. For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

Further, terms to be described later are terms defined in consideration of their functions in the disclosure, but may differ depending on intentions of a user or an operator, or customs. Accordingly, they should be defined on the basis of the contents of the whole description of the disclosure.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable data processing apparatus to produce a computer implemented process such that the instructions that execute on the computer or other programmable data processing apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Hereinafter, a base station is the subject that performs resource allocation to a terminal, and it may be at least one of Node B, base station (BS), eNode B (eNB), gNode B (gNB), radio access unit, base station controller, or node on a network. A terminal may include user equipment (UE), mobile station (MS), cellular phone, smart phone, computer, or multimedia system capable of performing a communication function. Further, embodiments of the disclosure may be applied to other communication systems having technical backgrounds or channel types similar to those of the embodiments of the disclosure to be described hereinafter. Further, the embodiments of the disclosure may also be applied to other communication systems through partial modifications thereof in a range that does not greatly deviate from the scope of the disclosure by the judgment of those skilled in the art.

In the following description, a term to identify an access node, a term to denote a network entity, a term to denote messages, a term to denote an interface between network entities, and a term to denote various types of identity information have been exemplified for convenience of description. Accordingly, the disclosure is not limited to the terms to be described later, and other terms to denote targets having equivalent technical meanings may be used.

For convenience in explanation, in the disclosure, terms and names defined in the standards of a 5G system are used. However, the disclosure is not restricted by the terms and names, and may be equally applied to systems complying with other standards.

In describing in detail the embodiments of the disclosure, although the communication standards defined in 3GPP will be the main target, the main subject of the disclosure will be able to be applied even to other communication systems having the similar technical backgrounds through slight modifications thereof in the range that does not greatly deviate from the scope of the disclosure by the judgment of those skilled in the art to which the disclosure pertains.

In describing the embodiments of the disclosure, a slice, service, network slice, network service, application slice, and application service may be interchangeably used.

Up to now, a communication system has been designed independently of applications provided on the communication system. After first accessing to the communication system, a user can be provided with a service through selection of an application intended to be used. Such a communication technology has been developed in a manner that network slices optimized to application characteristics are configured by respective applications in one huge network through grafting with the technical development, such as network function virtualization (NFV) and software defined networking (SDN).

One network slice is composed of an end-to-end (E2E) logical network including a terminal and an opposite node (opposite terminal or opposite application server). The user can be provided with a service by accessing a network slice dedicated in an application. That is, a user terminal can access one or more network slices at the same time.

The 3GPP taking charge of standardization of the mobile communication technology has completed the 5G Phase I standard in Rel-15, and 5G Phase I includes a network slicing function. In Rel-16, the network slicing Phase II standard is under progress.

Hereinafter, in the disclosure, a slice structure is defined, which is unable to be mutually provided (i.e., mutually exclusive) together with a network slice that can be mutually provided in case that several network slices are provided in a 5G-based network slicing structure. Further, in the disclosure, a method is defined, in which terminal configuration (UE configuration) information of mutually exclusive slice structure is provided to the terminal. Further, in the disclosure, a registration procedure of a terminal based on the terminal configuration information is defined. Further, in the disclosure, a procedure of updating the terminal configuration information is defined.

Further, the disclosure can provide a method for processing a control signal in a wireless communication system, which includes: receiving a first control signal transmitted from a network entity; processing the received first control signal; and transmitting a second control signal generated based on the first control signal processing to the network entity, or transmitting the second control signal generated based on the first control signal processing to another network entity.

A mobile communication service provider can provide various services in a mobile communication network, and it is required for respective services to satisfy different service requirements (e.g., latency, communication range, data rate, bandwidth, reliability, and the like). The mobile communication service provider can allocate a network resource suitable to the corresponding service for each slice or for each set of a specific slice. The network resource may mean logical resource or radio resource allocation provided by a network function (NF) or a device performing the NF.

The mobile communication service provider may make a contract with a service provider, and may configure a network slice for a service provided by a specific service provider. In case that the mobile communication service provider configures the network slice, specific network slices may be mutually provided together or may be provided mutually exclusively by a contract between the mobile communication service provider and the service provider, by the policy of the mobile communication service provider, or by government regulation.

FIG. 1 illustrates a 5G network slice structure according to an embodiment of the disclosure.

As an identifier for discriminating network slices, for example, single-network slice selection assistance information (S-NSSAI) may be used.

Referring to FIG. 1, a case that three network slices S-NSSAI #1 160, S-NSSAI #2 165, and S-NSSAI #3 170 are provided in a network of a mobile communication service provider will be described as an example. The network slice may be composed of network functions (NFs) which are necessary to provide a service supported by the network slice.

Entities performing network functions may be core network entities (e.g., access management function (AMF), session management function (SMF), user plane function (UPF), policy control function (PCF), and the like), and wireless network entities (e.g., base station, radio access network (RAN), access network (AN), gNodeB (gNB), eNodeB (eNB), and the like). Hereinafter, in the disclosure, the base station may be interchangeably used with the RAN. In the disclosure, for convenience, a device or an entity performing an access management function (AMF) may be expressed as AMF. Further, in the disclosure, for convenience, a device or an entity performing a session management function (SMF) may be expressed as SMF. Further, for convenience, a device or an entity performing a user plane function (UPF) may be expressed as UPF. Further, in the disclosure, for convenience, a device or an entity performing a policy control function (PCF) may be expressed as PCF. In addition, for convenience, an entity performing a function may be abbreviated and described as the name of the function.

Referring to FIG. 1, a specific network slice may share a specific network function. For example, S-NSSAI #1 160 and S-NSSAI #2 165 may share an AMF 120, and the NFs (SMF 125 and 135 and UPF 130 and 140) dedicated to the respective network slices may be selected. Further, referring to FIG. 1, the specific network slice may be composed of only the NFs dedicated to the corresponding network slice. For example, S-NSSAI #3 170 may be composed of only the NFs 145, 150, and 155 belonging to the S-NSSAI #3 only without any NF shared with other network slices.

Referring to FIG. 1, network slices capable of sharing a specific network function may be tied and classified into one slice group. For example, the S-NSSAI #1 160 and S-NSSAI #2 165, which share the AMF 120, may be indicated as slice group 1 175. The S-NSSAI #3 170, which does not share the network function with other network slices, may be indicated as slice group 2 180 that is another slice group.

In the AMF according to an embodiment of the disclosure, slice information (S-NSSAI) that can be provided by the AMF and slice group information (slice group ID) including the AMF may be configured and stored in the AMF. For example, the AMF 120 may store information indicating that the slices that can be provided by the AMF 120 are the S-NSSAI #1 160 and S-NSSAI #2 165, and the slice group including the AMF 145 is the slice group 1 175.

Further, referring to FIG. 1, the radio network resource RAN may be shared by several network slices. For example, the base station 115 may be connected to both the AMF 120 supporting the S-NSSAI #1 160 and S-NSSAI #2 165 and the AMF 145 supporting the S-NSSAI #3 170.

FIG. 2 illustrates a method for configuring information related to a network slice according to an embodiment of the disclosure.

According to this embodiment, configuration information for using the network slice provided by the mobile communication service provider with respect to the terminal supporting a function of mutually exclusive access to network slices may be stored in the terminal, or may be transmitted to the terminal. The configuration information related to the network slice may be called configured NSSAI.

The configuration information related to the network slice stored in the terminal according to an embodiment of the disclosure may follow the following format.

TABLE 1

A list of SG ID and subscribed S-NSSAI

| S-NSSAI | SG ID |
|---|---|
| S-NSSAI 1 | SG ID 1 |
| S-NSSAI 2 | SG ID 2 |
| S-NSSAI 3 | ... |

For example, in case that the terminal 110 illustrated in FIG. 1 can use three network slices S-NSSAI #1, S-NSSAI #2, and S-NSSAI #3, the terminal configuration information may be expressed as follows.

TABLE 2

| S-NSSAI | SG ID |
|---|---|
| S-NSSAI 1 | SG ID 1 |
| S-NSSAI 2 | SG ID 1 |
| S-NSSAI 3 | SD ID 2 |

As another embodiment of the disclosure, in case that a certain network slice does not belong to one mutually exclusive network slice only, but is able to be used together with other network slices, the SG ID value of the corresponding network slice may be configured as a specific value indicating that the network slice can coexist with other network slices. For example, as illustrated in FIG. 2, if S-NSSAI 4 can coexist with other network slices, the SG ID value may be set to "0" to indicate this. In this case, the S-NSSAI 4 may be used together with S-NSSAI 1 and S-NSSAI 2 which belong to the SG ID 1, or may be used together with S-NSSAI 3 belonging to SG ID 2.

The terminal may request usage of the network slice to the network, and in this case, the network slice information whose usage can be requested by the terminal may include only the network slice information that can coexist as described above. For example, only the S-NSSAI 1 and S-NSSAI 2, or S-NSSAI 3 and S-NSSAI 4 can be requested at the same time.

Figure 3:
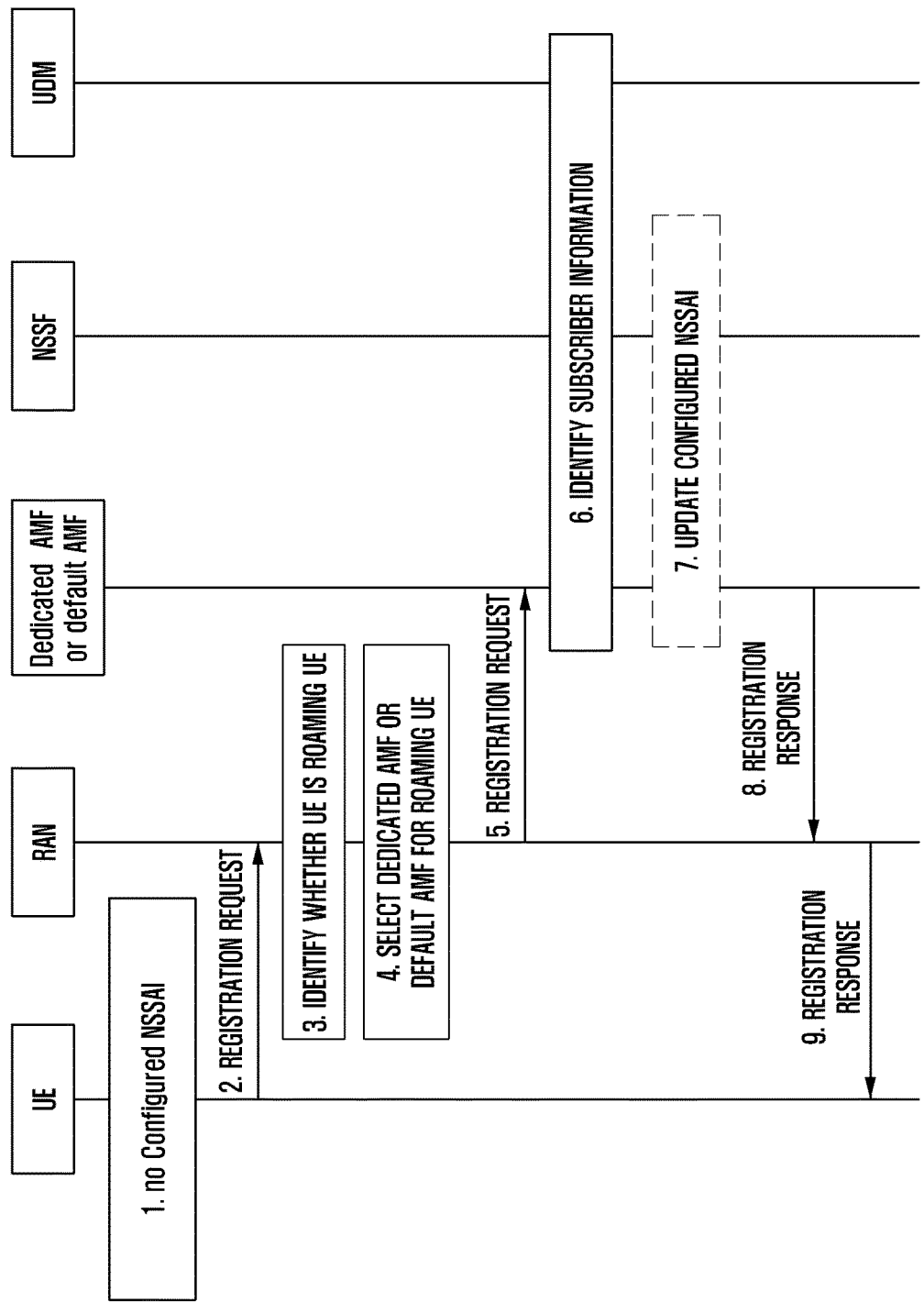
FIG. 3 illustrates a network registration procedure of a terminal according to an embodiment of the disclosure.

FIG. 3 illustrates a network registration procedure of a terminal according to an embodiment of the disclosure.

In an embodiment of the disclosure, a situation in which the terminal does not have configured NSSAI information will be described as an example. Specifically, a situation where the terminal does not have the configured NSSAI information that can be used for the corresponding service provider, that is, a case that the terminal according to the disclosure accesses the mobile communication network to which the terminal subscribes, a situation where the terminal does not have the configured NSSAI information, or a situation where the terminal accesses the mobile communication network belonging to another service provider that is not the mobile communication network to which the terminal subscribes, will be described as an example.

In this case, the terminal may transmit a registration request message that does not include request information of the network slice (step 2).

The base station having received the registration request message at step 2 can identify whether the terminal is a roaming user subscribing to another mobile communication service provider based on ID information of the terminal included in the registration request message received from the terminal or information indicating whether the terminal is the roaming user transmitted together with the registration request message (step 3).

In this case, the ID information of the terminal may be a value corresponding to a temporary ID (e.g., 5G globally unique temporary identifier (5G-GUTI) or the like) or a unique ID (e.g., subscription permanent identifier (SUPI) or the like) value including information on the mobile communication network to which the terminal subscribes. Further, the information that can indicate whether the terminal is the roaming user may be an identifier indicating the roaming or an S-NSSAI value used (defined) for the roaming.

Further, the base station can select a dedicated AMF for the roaming terminal or a default AMF for a general terminal based on the result of the identification (step 4).

If it is identified that the terminal is the roaming terminal, the base station may transfer the AMF (dedicated AMF) designated to process the connection request message of the roaming terminal (step 5).

In this case, the dedicated AMF may be the AMF which can be configured to be connectable to not only all network devices or some network devices (e.g., AMF) included in the corresponding network slice but also all network devices or some network devices (e.g., AMF) included in a certain network slice.

If it is not identified that the terminal is the roaming terminal, the base station transfers the registration request message received from the terminal to a predetermined default AMF. In this case, the dedicated AMF may be the AMF which is included in the specific network slice like the dedicated AMF, and which can be configured to be connectable to not only all network devices or some network devices (e.g., AMF) included in the corresponding network slice but also all network devices or some network devices (e.g., AMF) included in a certain network slice.

In accordance with the operation policy of the mobile communication network service provider, the dedicated AMF and the default AMF may exist independently, or may be implemented as one network device.

At step 5, the AMF having received the registration request message of the terminal from the base station may request the subscription information of the terminal from a user data management (UDM) of the mobile communication network to which the terminal subscribes, and may acquire the subscription information of the terminal from the UDM (step 6).

The subscription information of the terminal may include network slice information to which the terminal subscribes. The network slice information to which the terminal subscribes may include S-NSSAI information and slice group ID information available to the terminal. The AMF may perform a separate authentication procedure with the terminal according to situations before or after receiving the subscription information from the UDM.

If the AMF is a default AMF, the AMF may receive network slice information of the terminal from the UDM at step 6, and then may configure or update the configured NSSAI based on all the network slice information and slice group ID information to which the terminal subscribes, without being limited to the specific slice group, using predetermined information in the default AMF at step 7.

As another embodiment of the disclosure, the AMF may receive the network slice information of the terminal from the UDM at step 6, and then may configure or update the configured NSSAI based on all the network slice information and slice group ID information to which the terminal subscribes, without being limited to the specific slice group, using the NSSF at step 7.

Further, when configuring the configured NSSAI, the AMF may additionally configure the network slice information (allowed NSSAI) that the terminal can use in the mobile communication network directly or using the NSSF.

If the AMF has recognized that the terminal is the roaming terminal, the AMF may receive the network slice information of the terminal from the UDM at step 6, and then may perform mapping of the network slice information and the slice group ID information to which the terminal subscribes onto the network slice information and the slice group ID used in the mobile communication network to which the AMF belongs, respectively, based on the predetermined information. That is, the AMF may identify the network slice information and the slice group ID information of the mobile communication network to which the dedicated AMF belongs, corresponding to the network slice information and the slice group ID information to which the terminal subscribes, based on the predetermined information, and may notify of the mapping-related information of the network slice information and the slice group information. If it is intended to use the network slice information and the slice group ID to which the terminal subscribes, the terminal may determine the network slice information and the slice group ID that can be used in the mobile communication network to which the AMF belongs through the connection information notified by the AMF, and may use the corresponding network slice information and slice group ID. That is, in case that the mobile communication network to which the terminal subscribes and the mobile communication network accessed by the terminal differ from each other due to the movement of the terminal (e.g., roaming), the network slice allocated in the mobile communication network to which the terminal subscribes and the network slice of the mobile communication network to which the AMF belongs are not equal to each other, and thus the AMF may transmit the mapping information and the terminal may use the mapping information.

As another embodiment, at step 7, the AMF may acquire mapping information between the network slice information and slice group ID information to which the terminal subscribes and the network slice information and slice group ID information used in the mobile communication network to which the AMF belongs using the NSSF. That is, the AMF may identify the network slice information and slice group ID of the mobile communication network to which the AMF belongs, which correspond to the network slice information and slice group ID information to which the terminal subscribes using the NSSF, and may be notified of the mapping-related information between the network slice information and slice group IDs.

Further, based on the mapping information, the AMF may configure the mapping information between the configured NSSAI including the slice information and the slice group ID that can be used in the mobile communication network to which the AMF belongs and the network slice information and the slice group ID to which the terminal subscribes. Further, the AMF may additionally configure the mapping information between the network slice information (allowed NSSAI) that the terminal can use in the mobile communication network whose subscription is currently requested by the terminal and the network slice information that can be used in the mobile communication network to which the terminal subscribes.

If the AMF is a dedicated AMF, the AMF may receive the network slice information of the terminal from the UDM at step 6, and then may perform mapping of the network slice information and slice group ID information to which the terminal subscribes onto the network slice information and slice group ID being used in the mobile communication network to which the dedicated AMF belongs using the predetermined information at step 7. That is, the AMF may identify the network slice information and slice group ID of the mobile communication network to which the dedicated AMF belongs, corresponding to the network slice information and slice group ID information to which the terminal subscribes, based on the predetermined information, and may notify of the mapping information of the network slice information and slice group ID.

As another embodiment, at step 7, the AMF may acquire mapping information between the network slice information and slice group ID information to which the terminal subscribes and the network slice information and slice group ID information used in the mobile communication network to which the AMF belongs using the NSSF. That is, the AMF may identify the network slice information and slice group ID of the mobile communication network to which the AMF belongs, which correspond to the network slice information and slice group ID information to which the terminal subscribes using the NSSF, and may be notified of the mapping-related information between the network slice information and slice group IDs.

Further, based on the mapping information, the AMF may configure the mapping information notifying that connection is made between the configured NSSAI and the slice information used in the mobile communication network and the mobile communication network to which the terminal subscribes. Further, the AMF may additionally configure the mapping information between the network slice information (allowed NSSAI) that the terminal can use in the mobile communication network whose subscription is currently requested by the terminal and the network slice information that can be used in the mobile communication network to which the terminal subscribes.

The AMF may include at least one of the configured NSSAI and mapping information configured at step 7 and the allowed NSSAI and mapping information configured additionally in the registration accept message at step 8 in the present embodiment, and may transmit the registration accept message to the base station through the AMF.

At step 9, the base station having received the registration response may transmit the registration response to the terminal.

Based on the allowed NSSAI and mapping information received together, the terminal having received the registration response at step 9 may perform a PDU session procedure that is necessary for the subsequently necessary service, or may configure the requested NSSAI by reselecting the network slice requiring the service based on the received configured NSSAI and mapping information, and may retransmit the registration request including the requested NSSAI.

Figure 4:
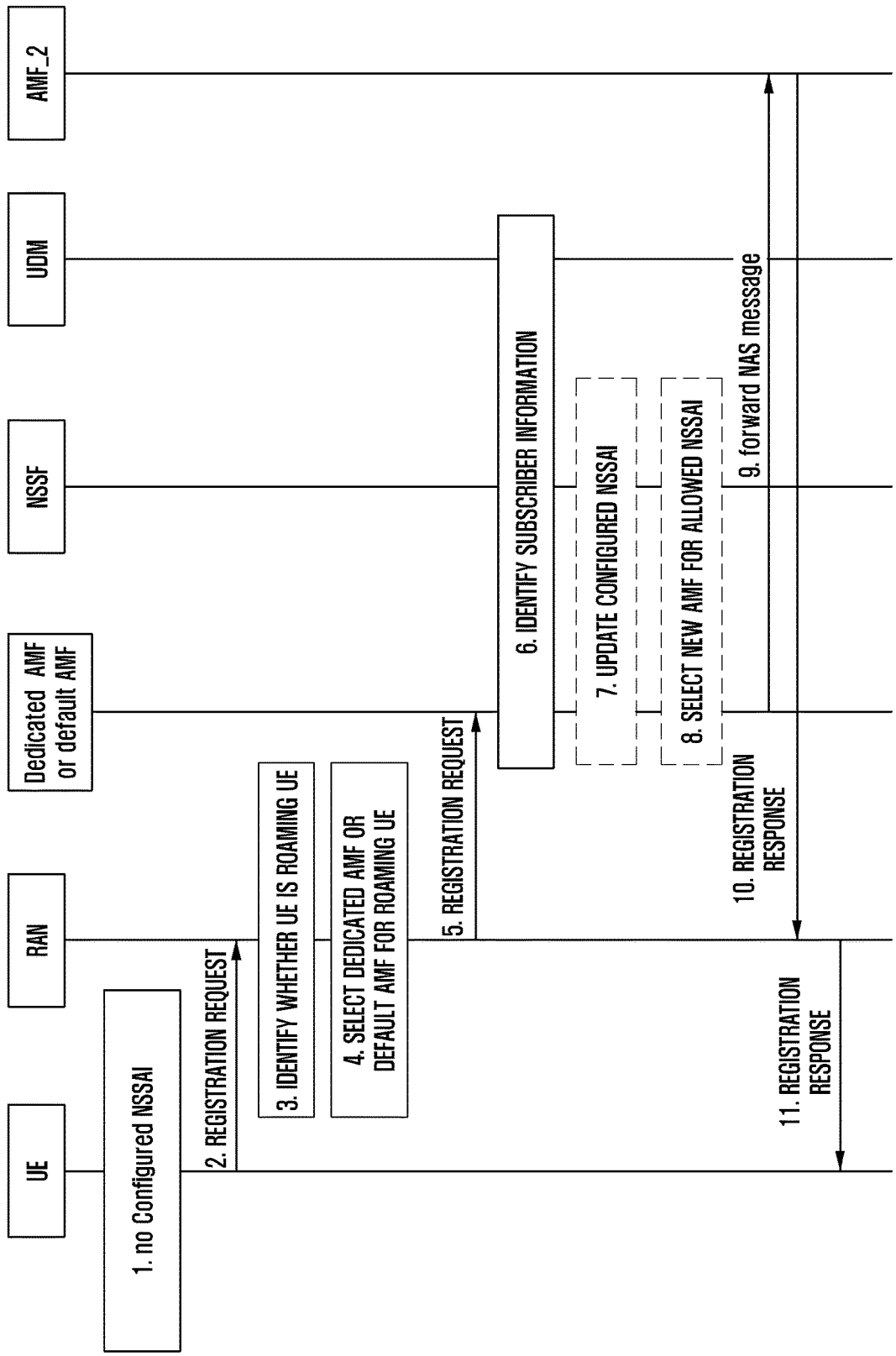
FIG. 4 illustrates a network registration procedure of a terminal according to an embodiment of the disclosure.

FIG. 4 illustrates a network registration procedure of a terminal according to another embodiment of the disclosure.

In an embodiment of the disclosure, a situation in which the terminal does not have configured NSSAI information will be described as an example. Specifically, a situation where the terminal does not have the configured NSSAI information that can be used for the corresponding service provider, that is, a case that the terminal according to the disclosure accesses the mobile communication network to which the terminal subscribes, a situation where the terminal does not have the configured NSSAI information, or a situation where the terminal accesses the mobile communication network belonging to another service provider that is not the mobile communication network to which the terminal subscribes, will be described as an example.

In this case, the terminal can transmit a registration request message that does not include request information of the network slice (step 2).

The base station having received the registration request message at step 2 can identify whether the terminal is a roaming user subscribing to another mobile communication service provider using ID information of the terminal included in the registration request message received from the terminal or information indicating whether the terminal is the roaming user transmitted together with the registration request message (step 3).

In this case, the ID information of the terminal may be a value corresponding to a temporary ID allocated from a previous mobile communication network or a unique ID value including information on the mobile communication network to which the terminal subscribes. The detailed contents are the same as those as described above, and thus will be omitted thereinafter.

Further, the base station can select a dedicated AMF for the roaming terminal or a default AMF for a general terminal based on the result of the identification (step 4).

If it is identified that the terminal is the roaming terminal, the base station may transfer the AMF (dedicated AMF) designated to process the connection request message of the roaming terminal (step 5).

In this case, the dedicated AMF may be the AMF which can be configured to be connectable to not only all network devices or some network devices (e.g., AMF) included in the corresponding network slice but also all network devices or some network devices (e.g., AMF) included in a certain network slice.

If it is not identified that the terminal is the roaming terminal, the base station transfers the registration request message received from the terminal to a predetermined default AMF. In this case, the default AMF may be the AMF which is included in the specific network slice like the dedicated AMF, and which can be configured to be connectable to not only all network devices or some network devices (e.g., AMF) included in the corresponding network slice but also all network devices or some network devices (e.g., AMF) included in a certain network slice.

At step 5, the AMF having received the registration request message of the terminal from the base station may request the subscription information of the terminal from the UDM of the mobile communication network to which the terminal subscribes, and may acquire the subscription information of the terminal from the UDM (step 6).

The subscription information of the terminal may include network slice information to which the terminal subscribes. The network slice information to which the terminal subscribes may include S-NSSAI information and slice group ID information available to the terminal. The AMF may perform a separate authentication procedure with the terminal according to situations before or after receiving the subscription information from the UDM.

If the AMF is a default AMF, the AMF may receive network slice information of the terminal from the UDM at step 6, and then may configure or update the configured NSSAI based on all the network slice information and slice group ID information to which the terminal subscribes, without being limited to the specific slice group, using the predetermined information at step 7.

As another embodiment of the disclosure, the AMF may receive the network slice information of the terminal from the UDM at step 6, and then may configure or update the configured NSSAI based on all the network slice information and slice group ID information to which the terminal subscribes, without being limited to the specific slice group, using the NSSF at step 7.

Further, when configuring the configured NSSAI, the AMF may additionally configure the network slice information (allowed NSSAI) that the terminal can use in the mobile communication network directly or using the NSSF.

If the AMF has recognized that the terminal is the roaming terminal, the AMF may receive the network slice information of the terminal from the UDM at step 6, and then may perform mapping of the network slice information and the slice group ID information to which the terminal subscribes onto the network slice information and the slice group ID used in the mobile communication network to which the AMF belongs, respectively, based on the predetermined information. That is, the AMF may identify the network slice information and the slice group ID information of the mobile communication network to which the dedicated AMF belongs, corresponding to the network slice information and the slice group ID information to which the terminal subscribes, based on the predetermined information, and may notify of the information on the mapping relationship between the network slice information and the slice group information. If it is intended to use the network slice information and the slice group ID to which the terminal subscribes, the terminal may determine the network slice information and the slice group ID that can be used in the mobile communication network to which the AMF belongs through the connection information notified by the AMF, and may use the corresponding network slice information and slice group ID.

As another embodiment, at step 7, the AMF may acquire mapping information between the network slice information and slice group ID information to which the terminal subscribes and the network slice information and slice group ID information used in the mobile communication network to which the AMF belongs using the NSSF. That is, the AMF may identify the network slice information and slice group ID of the mobile communication network to which the AMF belongs, which correspond to the network slice information and slice group ID information to which the terminal subscribes using the NSSF, and may be notified of the mapping-related information between the network slice information and slice group IDs.

Further, based on the mapping information, the AMF may configure the mapping information between the configured NSSAI including the slice information and the slice group ID that can be used in the mobile communication network to which the AMF belongs and the network slice information and the slice group ID to which the terminal subscribes. Further, the AMF may additionally configure the mapping information between the network slice information (allowed NSSAI) that the terminal can use in the mobile communication network whose subscription is currently requested by the terminal and the network slice information that can be used in the mobile communication network to which the terminal subscribes.

If the AMF is a dedicated AMF, the AMF may receive the network slice information of the terminal from the UDM at step 6, and then may perform mapping of the network slice information and slice group ID information to which the terminal subscribes onto the network slice information and slice group ID being used in the mobile communication network to which the dedicated AMF belongs using the predetermined information at step 7. That is, the AMF may identify the network slice information and slice group ID of the mobile communication network to which the dedicated AMF belongs, corresponding to the network slice information and slice group ID information to which the terminal subscribes, based on the predetermined information, and may notify of the mapping information of the network slice information and slice group ID.

As another embodiment, at step 7, the AMF may acquire mapping information between the network slice information and slice group ID information to which the terminal subscribes and the network slice information and slice group ID information used in the mobile communication network to which the AMF belongs using the NSSF. That is, the AMF may identify the network slice information and slice group ID of the mobile communication network to which the AMF belongs, which correspond to the network slice information and slice group ID information to which the terminal subscribes using the NSSF, and may be notified of the mapping-related information between the network slice information and slice group IDs.

Further, based on the mapping information, the AMF may configure the mapping information notifying that connection is made between the configured NSSAI and the slice information used in the mobile communication network and the mobile communication network to which the terminal subscribes. Further, the AMF may additionally configure the mapping information between the network slice information (allowed NSSAI) that the terminal can use in the mobile communication network whose subscription is currently requested by the terminal and the network slice information that can be used in the mobile communication network to which the terminal subscribes.

The AMF may determine a new AMF (AMF_2) suitable to service the network slice indicated as the allowed NSSAI based on the configured NSSAI configured at step 7 and the allowed NSSAI additionally configured (step 8).

In order to determine the new AMF (AMF_2), the AMF may acquire new AMF information by using predetermined information or by requesting from the NSSF.

At step 9, the AMF transfers, to the AM_2, terminal information including at least one of the registration request received from the terminal, the configured NSSAI and mapping information configured for the terminal, and the allowed NSSAI and mapping information and information on an address of the base station having transferred the terminal's request.

At step 10, the AMF_2 transfers a registration response message to the base station as a response to the terminal's registration request received from the AMF. In this case, the registration response includes at least one of the configured NSSAI and mapping information or the allowed NSSAI and mapping information.

If necessary before transmitting the registration response, the AMF_2 may perform a procedure of configuring a connection to the base station.

At step 11, the base station transmits the registration response received at step 10 to the terminal.

At step 11, based on the received allowed NSSAI and mapping information, the terminal having received the registration accept may perform a PDU session procedure that is necessary for the subsequently necessary service, or may configure the requested NSSAI by reselecting the network slice requiring the service based on the received configured NSSAI and mapping information, and may retransmit the registration request including the requested NSSAI.

Figure 5:
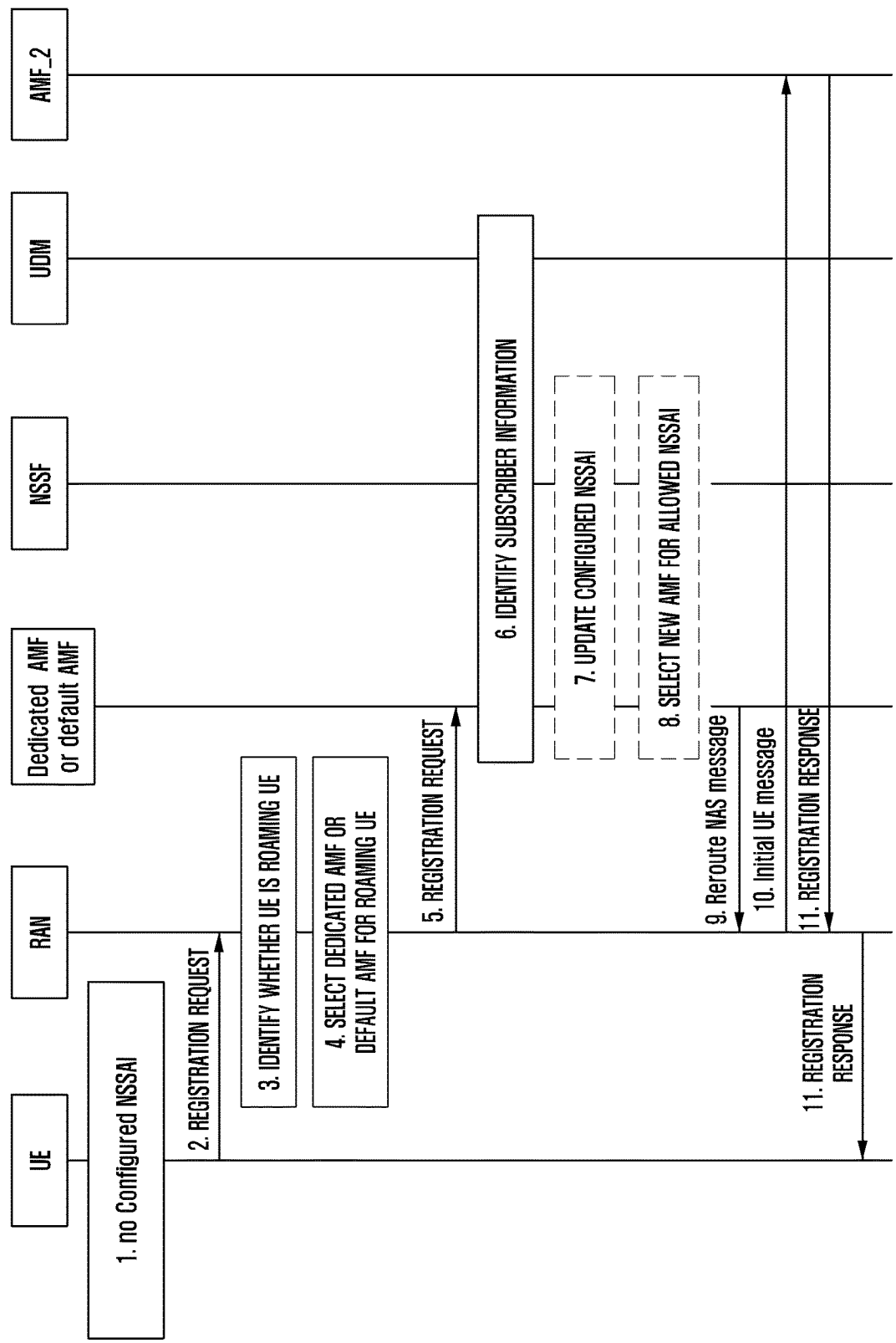
FIG. 5 illustrates a network registration procedure of a terminal according to an embodiment of the disclosure.

FIG. 5 illustrates a network registration procedure of a terminal according to still another embodiment of the disclosure.

In an embodiment of the disclosure, a situation in which the terminal does not have configured NSSAI information will be described as an example. Specifically, a situation where the terminal does not have the configured NSSAI information that can be used for the corresponding service provider, that is, a case that the terminal according to the disclosure accesses the mobile communication network to which the terminal subscribes, a situation where the terminal does not have the configured NSSAI information, or a situation where the terminal accesses the mobile communication network belonging to another service provider that is not the mobile communication network to which the terminal subscribes, will be described as an example.

In this case, the terminal can transmit a registration request message that does not include request information of the network slice (step 2).

The base station having received the registration request message at step 2 can identify whether the terminal is a roaming user subscribing to another mobile communication service provider using ID information of the terminal included in the registration request message received from the terminal or information indicating whether the terminal is the roaming user transmitted together with the registration request message (step 3).

In this case, the ID information of the terminal may be a value corresponding to a temporary ID allocated from a previous mobile communication network or a unique ID value including information on the mobile communication network to which the terminal subscribes.

Further, the base station can select a dedicated AMF for the roaming terminal or a default AMF for a general terminal based on the result of the identification (step 4).

If it is identified that the terminal is the roaming terminal, the base station may transfer the AMF (dedicated AMF) designated to process the connection request message of the roaming terminal (step 5).

In this case, the dedicated AMF may be the AMF which can be configured to be connectable to not only all network devices or some network devices (e.g., AMF) included in the corresponding network slice but also all network devices or some network devices (e.g., AMF) included in a certain network slice.

If it is not identified that the terminal is the roaming terminal, the base station transfers the registration request message received from the terminal to a predetermined default AMF. In this case, the default AMF may be the AMF which is included in the specific network slice like the dedicated AMF, and which can be configured to be connectable to not only all network devices or some network devices (e.g., AMF) included in the corresponding network slice but also all network devices or some network devices (e.g., AMF) included in a certain network slice.

At step 5, the AMF having received the registration request message of the terminal from the base station may request the subscription information of the terminal from the UDM of the mobile communication network to which the terminal subscribes, and may acquire the subscription information of the terminal from the UDM (step 6).

The subscription information of the terminal may include network slice information to which the terminal subscribes. The network slice information to which the terminal subscribes may include S-NSSAI information and slice group ID information available to the terminal. The AMF may perform a separate authentication procedure with the terminal according to situations before or after receiving the subscription information from the UDM.

If the AMF is a default AMF, the AMF may receive network slice information of the terminal from the UDM at step 6, and then may configure or update the configured NSSAI based on all the network slice information and slice group ID information to which the terminal subscribes, without being limited to the specific slice group, using the predetermined information at step 7.

As another embodiment of the disclosure, the AMF may receive the network slice information of the terminal from the UDM at step 6, and then may configure or update the configured NSSAI based on all the network slice information and slice group ID information to which the terminal subscribes, without being limited to the specific slice group, using the NSSF at step 7.

Further, when configuring the configured NSSAI, the AMF may additionally configure the network slice information (allowed NSSAI) that the terminal can use in the mobile communication network directly or using the NSSF.

If the AMF has recognized that the terminal is the roaming terminal, the AMF may receive the network slice information of the terminal from the UDM at step 6, and then may perform mapping of the network slice information and the slice group ID information to which the terminal subscribes onto the network slice information and the slice group ID used in the mobile communication network to which the AMF belongs, respectively, based on the predetermined information. That is, the AMF may identify the network slice information and the slice group ID information of the mobile communication network to which the dedicated AMF belongs, corresponding to the network slice information and the slice group ID information to which the terminal subscribes, based on the predetermined information, and may notify of the information on the mapping relationship between the network slice information and the slice group information. If it is intended to use the network slice information and the slice group ID to which the terminal subscribes, the terminal may determine the network slice information and the slice group ID that can be used in the mobile communication network to which the AMF belongs through the connection information notified by the AMF, and may use the corresponding network slice information and slice group ID.

As another embodiment, at step 7, the AMF may acquire mapping information between the network slice information and slice group ID information to which the terminal subscribes and the network slice information and slice group ID information used in the mobile communication network to which the AMF belongs using the NSSF. That is, the AMF may identify the network slice information and slice group ID of the mobile communication network to which the AMF belongs, which correspond to the network slice information and slice group ID information to which the terminal subscribes using the NSSF, and may be notified of the mapping-related information between the network slice information and slice group IDs.

Further, based on the mapping information, the AMF may configure the mapping information between the configured NSSAI including the slice information and the slice group ID that can be used in the mobile communication network to which the AMF belongs and the network slice information and the slice group ID to which the terminal subscribes. Further, the AMF may additionally configure the mapping information between the network slice information (allowed NSSAI) that the terminal can use in the mobile communication network whose subscription is currently requested by the terminal and the network slice information that can be used in the mobile communication network to which the terminal subscribes.

If the AMF is a dedicated AMF, the AMF may receive the network slice information of the terminal from the UDM at step 6, and then may perform mapping of the network slice information and slice group ID information to which the terminal subscribes onto the network slice information and slice group ID being used in the mobile communication network to which the dedicated AMF belongs using the predetermined information at step 7. That is, the AMF may identify the network slice information and slice group ID of the mobile communication network to which the dedicated AMF belongs, corresponding to the network slice information and slice group ID information to which the terminal subscribes, based on the predetermined information, and may notify of the mapping information of the network slice information and slice group ID.

As another embodiment, at step 7, the AMF may acquire mapping information between the network slice information and slice group ID information to which the terminal subscribes and the network slice information and slice group ID information used in the mobile communication network to which the AMF belongs using the NSSF. In addition, based on the mapping information, the AMF may configure the configured NSSAI and mapping information. That is, the AMF may identify the network slice information and slice group ID of the mobile communication network to which the AMF belongs, which correspond to the network slice information and slice group ID information to which the terminal subscribes using the NSSF, and may be notified of the mapping-related information between the network slice information and slice group IDs.

Further, the terminal may additionally configure network slice information (allowed NSSAI) and mapping information that can be used in the mobile communication network to which the terminal currently requests to subscribe.

The AMF may determine a new AMF (AMF_2) suitable to service the network slice indicated as the allowed NSSAI based on the configured NSSAI configured at step 7 and the allowed NSSAI additionally configured (step 8).

In order to determine the new AMF (AMF_2), the AMF may acquire new AMF information by using predetermined information or by requesting from the NSSF.

At step 9, the AMF may transmit, to the AMF_2, a reroute NAS message for requesting to transfer the registration request message received from the terminal. In this case, the reroute NAS message may include at least one of information on the selected AMF_2, the configured NSSAI configured for the terminal and mapping information, and the allowed NSSAI and mapping information in addition to the registration request message received from the terminal.

At step 10, the base station transfers, to the AMF_2, an initial UE message including at least one of the terminal's registration request received at step 9, the configured NSSAI configured for the terminal, and the allowed NSSAI through the information on the AMF_2 received at step 9.

At step 11, the AMF_2 transmits a registration response (registration accept) to the base station in response to the terminal's registration request included in the initial UE message received from the base station. In this case, the registration response (registration accept) includes at least one of the configured NSSAI and mapping information or the allowed NSSAI and mapping information.

At step 12, the base station transmits the registration response received from the AMF_2 to the terminal.

At step 12, based on the allowed NSSAI and mapping information received together, the terminal having received the registration accept may perform a PDU session procedure that is necessary for the subsequently necessary service, or may configure the requested NSSAI by reselecting the network slice requiring the service based on the received configured NSSAI and mapping information, and may retransmit the registration request including the requested NSSAI.

Figure 6:
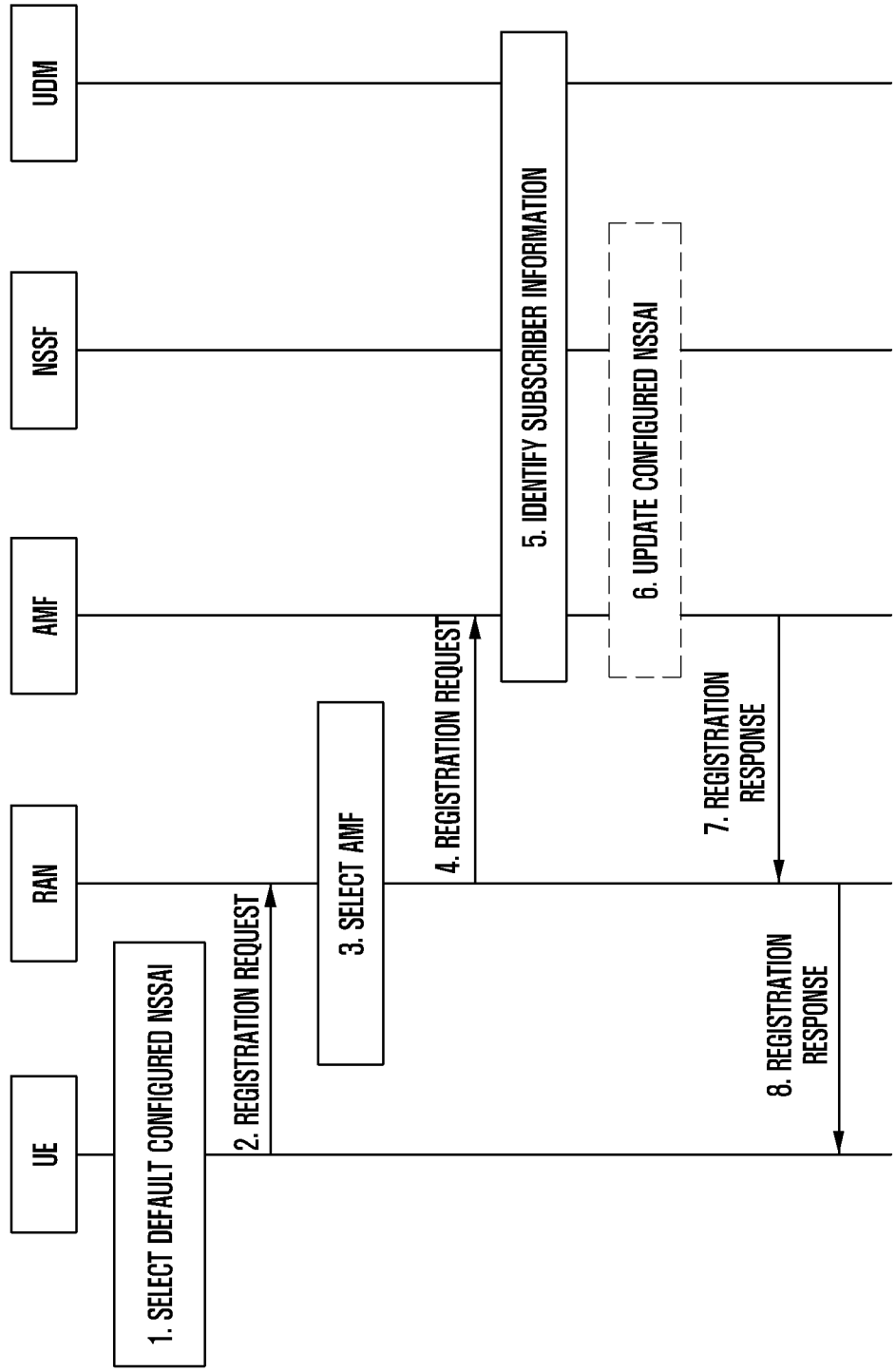
FIG. 6 illustrates a network registration procedure of a terminal according to another embodiment of the disclosure.

FIG. 6 illustrates a network registration procedure of a terminal according to still another embodiment of the disclosure.

In an embodiment of the disclosure, a situation will be exemplarily described, in which, in case of accessing another mobile communication network, the terminal has default configured NSSAI information for notifying that the terminal is the roaming terminal and requesting an update of the configured NSSAI information. The default configured NSSAI may be differently configured by individual mobile communication networks, and may be configured as separate default configured NSSAI information commonly used in all mobile communication networks.

In this case, if the terminal accesses the mobile communication network belonging to another service provider, which is not the mobile communication network to which the terminal subscribes, the terminal may transmit a registration request message including default configured NSSAI belonging to the mobile communication network (step 2). In this case, the registration message may include the above-described information in the form of request NSSAI, and the default configured NSSAI may be selected or determined as the requested NSSAI.

At step 2, the base station having received the registration request message selects the AMF to process the connection request message of the terminal based on the terminal's requested NSSAI included in the registration request message received from the terminal. If the base station is unable to select the AMF based on the requested NSSAI, the base station may select the AMF designated to process the registration request of the terminal using a method according to another embodiment of the disclosure, for example, a method for identifying whether the terminal is the roaming user subscribing to the other mobile communication service provider from terminal ID information or information capable of indicating whether the terminal is the roaming user included in the registration request message, or a method for selecting the default AMF predetermined to be selected when no information can be used.

At step 3, the AMF selected by the base station may be the AMF selected based on the default configured NSSAI, the dedicated AMF for the roaming terminal selected when the terminal is the roaming terminal, or the default AMF configured to be basically connected to the terminal. In this case, the AMFs may be AMFs which are included in the specific network slices, and can be configured to be connectable to not only all network devices or some network devices (e.g., AMF) included in the corresponding network slice but also all network devices or some network devices (e.g., AMF) included in a certain network slice.

At step 4, the base station transfers the terminal's registration request message to the selected AMF.

The AMF having received the terminal's registration request message from the base station may request terminal's subscription information from the UDM of the mobile communication network to which the terminal subscribes, and may acquire the terminal's subscription information from the UDM (step 5).

The terminal's subscription information may include the network slice information to which the terminal subscribes. The network slice information to which the terminal subscribes may include S-NSSAI information and slice group ID information that can be used by the terminal. The AMF may perform a separate authentication procedure with the terminal according to situations before or after receiving the subscription information from the UDM.

Accordingly, the AMF may receive the network slice information of the terminal from the UDM, and then may configure or update the configured AMF based on all the network slice information and slice group ID information to which the terminal subscribes, without being limited to the specific slice group, using the predetermined information at step 6.

As another embodiment of the disclosure, the AMF may receive the network slice information of the terminal from the UDM, and then may configure or update the configured NSSAI based on all the network slice information and slice group ID information to which the terminal subscribes, without being limited to the specific slice group, using the NSSF at step 6.

Further, when configuring the configured NSSAI, the AMF may additionally configure the network slice information (allowed NSSAI) that the terminal can use in the mobile communication network directly or through the NSSF.

Further, the AMF may perform mapping of the network slice information and the slice group ID information to which the terminal subscribes onto the network slice information and the slice group ID used in the mobile communication network to which the AMF belongs, respectively, through the predetermined information at step 6 after receiving the terminal's network slice information from the UDM. That is, the AMF may identify the network slice information and the slice group ID information of the mobile communication network to which the dedicated AMF belongs, corresponding to the network slice information and the slice group ID information to which the terminal subscribes, based on the predetermined information, and may notify of the information on the mapping relationship between the network slice information and the slice group information.

As another embodiment, at step 6, the AMF may acquire mapping information between the network slice information and slice group ID information to which the terminal subscribes and the network slice information and slice group ID information used in the mobile communication network to which the AMF belongs through the NSSF. That is, the AMF may identify the network slice information and slice group ID of the mobile communication network to which the AMF belongs, which correspond to the network slice information and slice group ID information to which the terminal subscribes, using the NSSF, and may be notified of the mapping-related information between the network slice information and slice group information.

Further, based on the mapping information, the AMF may configure the mapping information between the configured NSSAI including the slice information and the slice group ID that can be used in the mobile communication network to which the AMF belongs and the network slice information and the slice group ID to which the terminal subscribes. Further, the AMF may additionally configure the mapping information between the network slice information (allowed NSSAI) that the terminal can use in the mobile communication network whose subscription is currently requested by the terminal and the network slice information that can be used in the mobile communication network to which the terminal subscribes.

At least one of the configured NSSAI and mapping information configured at step 6 and the allowed NSSAI and mapping information additionally configured is included in the registration accept message to be transmitted to the base station through the AMF at step 7 according to this embodiment.

At step 8, the base station, having received the registration accept, transmits the registration accept to the terminal.

Based on the received allowed NSSAI and mapping information, the terminal having received the registration accept may perform the PDU session procedure that is necessary for the subsequently necessary service, or may configure the requested NSSAI by reselecting the network slice requiring the service based on the received configured NSSAI and mapping information, and may retransmit the registration request including the requested NSSAI.

The AMF having configured the configured NSSAI and the allowed NSSAI at step 6 according to this embodiment may select another AMF suitable to support the network slice indicating as the terminal and the allowed NSSAI based on the allowed NSSAI. If the other AMF is selected, the AMF may transfer terminal information including at least one of the terminal's registration request, the configured NSSAI and mapping information, and the allowed NSSAI and mapping information to the selected other AMF directly or through the base station. In this case, the AMF having received this configures the connection to the base station, and transmits the registration accept to the terminal. In this case, the registration response (registration accept) may include at least one of the configured NSSAI and mapping information and the allowed NSSAI and mapping information.

Figure 7:
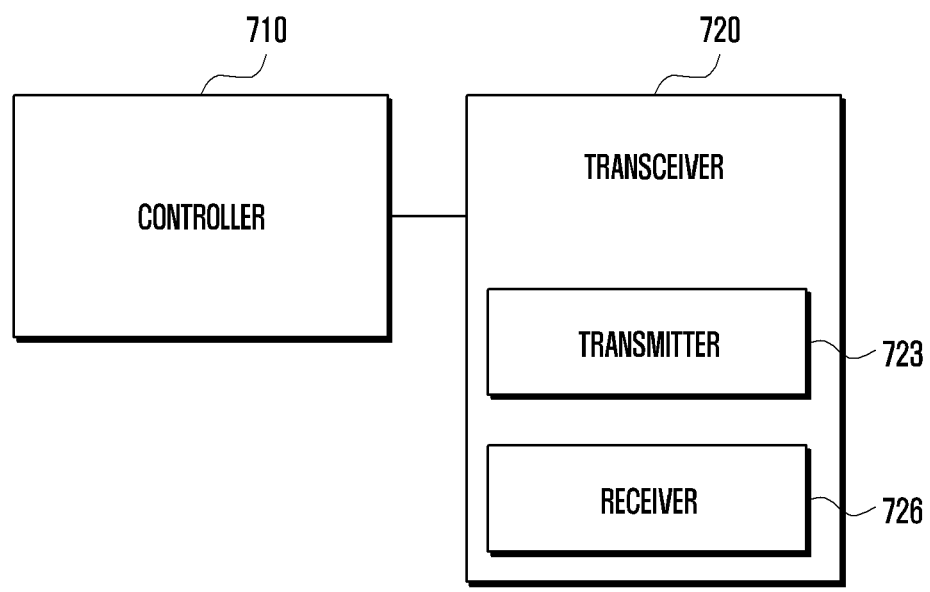
FIG. 7 is a diagram illustrating the configuration of a terminal according to the disclosure.

FIG. 7 is a diagram illustrating the configuration of a terminal according to the disclosure.

Referring to FIG. 7, the terminal may include a controller 710 and a transceiver 720. In the disclosure, the controller may be defined as a circuit, an application-specific integrated circuit, or at least one processor.

The transceiver 720 may be composed of a transmitter 723 and a receiver 726, and may transmit/receive signals with another network entity through the transmitter 723 and the receiver 726.

The controller 710 may control the overall operation of the terminal according to an embodiment proposed in the disclosure. For example, the controller 710 may control a signal flow between respective blocks to perform an operation according to the above-described flowchart.

Figure 8:
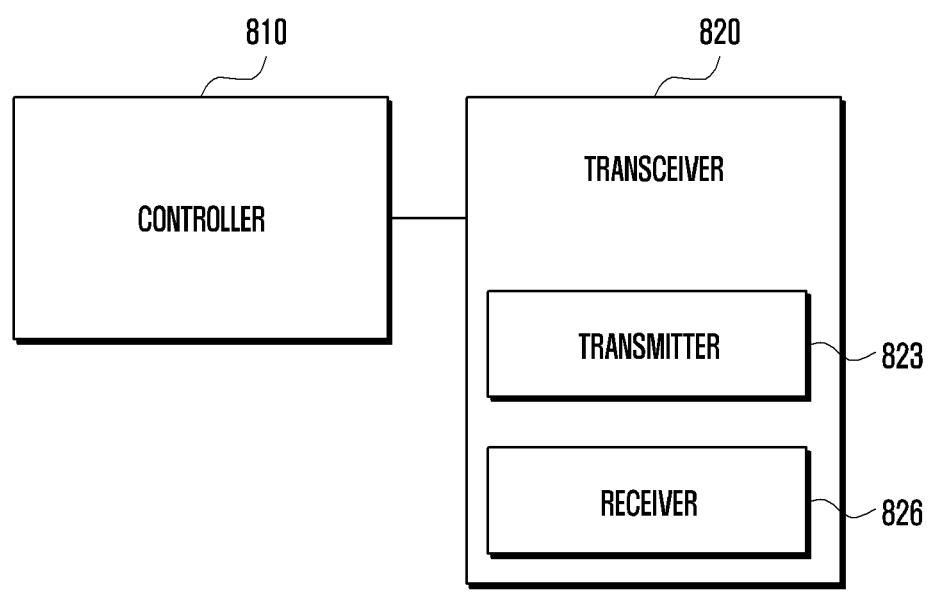
FIG. 8 is a diagram illustrating the configuration of a network entity according to the disclosure.

FIG. 8 is a diagram illustrating the configuration of a network entity according to the disclosure.

Referring to FIG. 7, the network entity may include a controller 810 and a transceiver 820. In the disclosure, the controller may be defined as a circuit, an application-specific integrated circuit, or at least one processor.

The transceiver 820 may be composed of a transmitter 823 and a receiver 826, and may transmit/receive signals with another network entity through the transmitter 823 and the receiver 826.

The controller 810 may control the overall operation of the network entity according to an embodiment proposed in the disclosure. For example, the controller 810 may control a signal flow between respective blocks to perform an operation according to the above-described flowchart.

The methods according to claims of the disclosure and embodiments described in the description may be implemented in the form of hardware, software, or a combination of hardware and software.

In case of implementation by software, a computer readable storage medium storing one or more programs (software modules) may be provided. One or more programs stored in the computer readable storage medium are configured for execution by one or more processors in an electronic device. The one or more programs include instructions that cause the electronic device to execute the methods according to the claims of the disclosure or embodiments described in the description.

Such a program (software module or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile discs (DVDs) or other types of optical storage devices, or a magnetic cassette. Further, the program may be stored in a memory composed of a combination of parts or the whole of them. Further, a plurality of memories may be included.

Further, the program may be stored in an attachable storage device that can be accessed through a communication network such as Internet, Intranet, local area network (LAN), wide LAN (WLAN), or storage area network (SAN) or a communication network composed of a combination thereof. The storage device may be accessed by a device that performs embodiments of the disclosure through an external port. Further, a separate storage device on the communication network may access a device that performs embodiments of the disclosure.

Meanwhile, in the drawings to explain the methods according to the disclosure, the order of explanations does not necessarily correspond to the order of executions, and the predecessor relationship between them may be changed or they may be executed in parallel.

Further, in the drawings to explain the methods according to the disclosure, some constituent elements may be omitted, and only some constituent elements may be included in a range in which the essence of the disclosure is not harmed.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Although the detailed embodiments of the disclosure have been described in the detailed description of the disclosure, the disclosure may be modified in various ways without departing from the scope of the disclosure. Accordingly, the scope of the disclosure should not be limited to the above-described embodiments, but should be defined by not only the claims but also equivalents thereof.

The invention claimed is:

1. A method performed by an access and mobility management function (AMF) in a communication system, the method comprising:
   receiving, from a user equipment (UE), a registration request message including a requested network slice selection assistance information (NSSAI);
   identifying subscription information for the UE including at least one subscribed single-NSSAI (S-NSSAI) and network slice simultaneous registration group information for each of the at least one subscribed S-NSSAI;
   identifying an allowed NSSAI including at least one S-NSSAI which shares a common network slice simultaneous registration group based on the requested NSSAI and the subscription information; and
   transmitting, to the UE, a registration accept message including the allowed NSSAI.

2. The method of claim 1, wherein at least one network slice simultaneous registration group is associated with each of the at least one subscribed S-NSSAI.

3. The method of claim 1, wherein the UE supports a restriction to simultaneous registration of network slices, and
   wherein the restriction is based on the subscription information.

4. The method of claim 1,
   wherein the requested NSSAI is associated with a default configured NSSAI, and
   wherein the registration accept message further includes at least one of mapping information of the allowed NSSAI, a configured NSSAI, or mapping information of the configured NSSAI.

5. A method performed by a user equipment (UE) in a communication system, the method comprising:
   transmitting, to an access and mobility management function (AMF), a registration request message including a requested network slice selection assistance information (NSSAI); and
   as a response to the registration request message, receiving, from the AMF, a registration accept message including an allowed NSSAI,
   wherein subscription information for the UE includes at least one subscribed single-NSSAI (S-NSSAI) and network slice simultaneous registration group information for each of the at least one subscribed NSSAI,
   wherein the allowed NSSAI depends on the requested NSSAI and the subscription information, and
   wherein the allowed NSSAI includes at least one S-NSSAI which shares a common network slice simultaneous registration group.

6. The method of claim 5, wherein at least one network slice simultaneous registration group is associated with each of the at least one subscribed S-NSSAI.

7. The method of claim 5,
   wherein the UE supports a restriction to simultaneous registration of network slices, and
   wherein the restriction is based on the subscription information.

8. The method of claim 5,
   wherein the requested NSSAI is associated with a default configured NSSAI, and
   wherein the registration accept message further includes at least one of mapping information of the allowed NSSAI, a configured NSSAI, or mapping information of the configured NSSAI.

9. An access and mobility management function (AMF) entity in a communication system, the AMF entity comprising:
   a transceiver; and
   a controller coupled with the transceiver and configured to:
      receive, from a user equipment (UE), a registration request message including a requested network slice selection assistance information (NSSAI),
      identify subscription information for the UE including at least one subscribed single-NSSAI (S-NSSAI) and network slice simultaneous registration group information for each of the at least one subscribed S-NSSAI,
      identify an allowed NSSAI including at least one S-NSSAI which shares a common network slice simultaneous registration group based on the requested NSSAI and the subscription information, and
      transmit, to the UE, a registration accept message including the allowed NSSAI.

10. The AMF entity of claim 9, wherein at least one network slice simultaneous registration group is associated with each of the at least one subscribed S-NSSAI.

11. The AMF entity of claim 9,
    wherein the UE supports a restriction to simultaneous registration of network slices, and
    wherein the restriction is based on the subscription information.

12. The AMF entity of claim 9,
    wherein the requested NSSAI is associated with a default configured NSSAI, and
    wherein the registration accept message further includes at least one of mapping information of the allowed NSSAI, a configured NSSAI, or mapping information of the configured NSSAI.

13. A user equipment (UE) in a communication system, the UE comprising:
    a transceiver; and
    a controller coupled with the transceiver and configured to:
       transmit, to an access and mobility management function (AMF) entity, a registration request message including a requested network slice selection assistance information (NSSAI), and as a response to the registration request message, receive, from the AMF entity, a registration accept message including an allowed NSSAI, wherein subscription information for the UE includes at least one subscribed single-NSSAI (S-NSSAI) and network slice simultaneous registration group information for each of the at least one subscribed NSSAI, wherein the allowed NSSAI depends on the requested NSSAI and the subscription information, and wherein the allowed NSSAI includes at least one S-NSSAI which shares a common network slice simultaneous registration group.

14. The UE of claim 13,
wherein at least one network slice simultaneous registration group is associated with each of the at least one subscribed S-NSSAI.

15. The UE of claim 13,
wherein the UE supports a restriction to simultaneous registration of network slices, and
wherein the restriction is based on the subscription information.

16. The UE of claim 13,
wherein the requested NSSAI is associated with a default configured NSSAI, and
wherein the registration accept message further includes at least one of mapping information of the allowed NSSAI, a configured NSSAI, or mapping information of the configured NSSAI.

* * * * *